UNITED STATES PATENT OFFICE 2,368,071

KETALS OF POLYHYDROXY NITRO COMPOUNDS

Murray Senkus, Terre Haute, Ind., assignor to Commercial Solvents Corporation, Terre Haute, Ind., a corporation of Maryland No Drawing. Application February 6, 1942, Serial No. 429,770

8 Claims. (Cl. 260—338)

My invention relates to new and useful cyclic ketals and a process for producing the same. More particularly, it concerns cyclic ketals having the general formula:

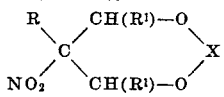

in which R may represent hydrogen, alpha-hydroxyalkyl, or alkyl, $R^1$ may be alkyl, aryl, furyl, or hydrogen, and X may represent either cycloalkylidene, alkyl-substituted cycloalkylidene, or

wherein $R^2$ and $R^3$ represent members of the group consisting of alkyl, alpha-haloalkyl, aryl, aralkyl, and furyl.

As examples of such compounds which may be included by the above generic formula are the 5-nitro-2,2-dialkyl-1,3-dioxanes, the 5-nitro-2-benzyl-2-methyl-1,3-dioxanes, and the 5-nitro-2,2-pentamethylene-1,3-dioxanes, which have the following structural formulas:

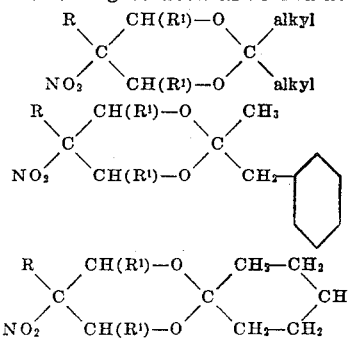

wherein R represents hydrogen, alpha-hydroxyalkyl, or alkyl, and $R^1$ represents alkyl, aryl, furyl, or hydrogen.

These compounds may, in general, be conveniently prepared by the distillation of a mixture consisting of a polyhydroxy nitro compound and the desired ketone in the presence of a small amount of an acid catalyst such as para-toluenesulfonic acid, hydrochloric acid, sulfuric acid, or the like. In certain instances it is desirable to employ a molar excess of the ketone. Likewise, it is frequently desirable to employ in the reaction mixture an organic liquid such as benzene, toluene, or xylene in order to remove the water, produced by the condensation, as a constant boiling mixture. The compounds produced in this manner may be obtained in a relatively pure state by washing the crude reaction mixture with a suitable quantity of water. If necessary, a dilute solution of a weak alkaline material, such as sodium carbonate, may be first employed to neutralize the acid catalyst present, followed by washing with water to remove any additional impurities. The liquid cyclic ketals, obtained in this manner, are preferably dried over a solid dehydrating agent such as calcium chloride, or anhydrous calcium sulfate, and then distilled. The cyclic ketals which are solids at room temperature are separated from the reaction mixture by filtration or any other satisfactory means, after which the said ketals may be conveniently purified by washing, if desired, with a dilute sodium carbonate solution, followed by treatment with water. Upon cooling, the solid products thus obtained may be further freed from impurities by recrystallizing from a solvent, such as methyl alcohol, ether, and the like. Colored impurities, in either the liquid or solid products, may be effectively removed by means of heating said products in the presence of a small amount of a decolorizing carbon, or similar material.

The polyhydroxy nitro compounds employed in carrying out my invention may be prepared by any suitable means. I prefer in general, however, to prepare such compounds in accordance with the procedure described in U. S. Patent No. 2,139,120 by H. B. Hass and B. M. Vanderbilt. According to this method, polyhydroxy nitro compounds of the class employed in my invention may be conveniently prepared by slowly adding two moles of the desired aldehyde, with thorough agitation, to one mole of a primary nitroparaffin in the presence of a small amount of hydrated lime, the temperature being preferably maintained between 30° C. and 35° C.

The polyhydroxy nitro compounds which may be employed in my invention and prepared in accordance with the procedure referred to above, may be any of such compounds which are capable of forming cyclic ketals under the described conditions, and it is to be understood that the expression "polyhydroxy nitro compounds" is to be interpreted as such. More specifically, these compounds may be represented by the following general formula:

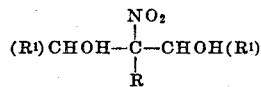

in which $R^1$ may represent hydrogen, alkyl, aryl, or furyl, and R may represent hydrogen, alkyl, or alphahydroxy alkyl. Specific examples of polyhydroxy nitro compounds included by the above generic formula are tris(hydroxymethyl)nitromethane, 2-methyl-2-nitro-1,3-propanediol, 2-ethyl-2-nitro-1,3-propanediol, 2-propyl-2-nitro-1,3-propanediol, 2-isopropyl-2-nitro-1,3-propanediol, 2-nitro-2-isobutyl-1,3-propanediol, 2,8-dimethyl-5-nitro-4,6-nonanediol, 1,3-diphenyl-2-nitro-1,3-propanediol, 2-nitro-1,3-difuryl-1,3-propanediol, and the like.

The ketones which may be utilized in the preparation of the cyclic ketals of my invention may be represented by the general formula:

RCOR[1]

in which R and R[1] combined may constitute a cycloalkylidene group and R and R[1] individually may represent alkyl, aryl, alpha-haloalkyl, furyl, and the like. As examples of specific ketones which may be included by the above formula, there may be mentioned methyl hexyl ketone, acetone, methyl ethyl ketone, methyl isobutyl ketone, chloroacetone, methyl benzyl ketone, acetophenone, cyclohexanone, 2-methylcyclohexanone, cyclopentanone, symmetrical dichloroacetone, chloromethyl ethyl ketone, chloroacetophenone, and the like.

The following examples describe certain of the new cyclic ketals and the methods for preparing the same; however, such examples are not to be construed as limiting my invention, as I have found that the reaction between ketones and polyhydroxy nitro compounds of the type described above is general and may be readily effected.

EXAMPLE I 5-nitro-2-chloromethyl-5 - hydroxymethyl - 2-methyl-1,3-dioxane was prepared by heating a mixture consisting of 150 parts of tris(hydroxymethyl)nitromethane, 92 parts of chloroacetone, 175 parts of benzene, and one part of para-toluenesulfonic acid in a reflux apparatus connected to a Dean and Stark moisture trap. When approximately 18 parts of water had collected in the moisture trap, the refluxing was discontinued, and the reaction mixture cooled and agitated with 500 parts of a two per cent sodium carbonate solution. The nonaqueous layer was washed with water and heated to 100° C., for an hour with 10 parts of decolorizing charcoal, after which it was dissolved in about 1500 parts of ether, and filtered. The filtrate was concentrated on the steam bath, and upon cooling, the product crystallized. The 5-nitro-2-chloromethyl-5-hydroxymethyl-2-methyl - 1,3 - dioxane, obtained in this manner, amounted to 194 parts, corresponding to a yield of 87 per cent.

Analysis calculated for $C_7H_{12}NO_5Cl$: Cl, 15.72; found, Cl, 15.70.

EXAMPLE II 5-nitro-5-hydroxymethyl-2-methyl-2 - phenyl-1,3-dioxane was prepared by reacting a mixture of 150 parts of tris(hydroxymethyl)nitromethane, 120 parts of acetophenone, 175 parts of benzene, and 0.5 part of paratoluenesulfonic acid at reflux temperature, according to the procedure as outlined in Example I. The 5-nitro-5-hydroxymethyl-2-methyl-2-phenyl-1,3-dioxane obtained in this manner amounted to 136 parts, corresponding to a yield of 54 per cent.

Analysis calculated for $C_{12}H_{15}NO_5$: N, 5.53; found, N, 5.61.

EXAMPLE III 5-nitro-2,2-diphenyl-5-methyl-1,3-dioxane was prepared by refluxing a mixture consisting of 182 parts of benzophenone, 135 parts of 2-nitro-2-methyl-1,3-propanediol, 132 parts of xylene, and 0.5 part of paratoluenesulfonic acid for approximately twelve hours. At the end of this time substantially all of the water formed by the reaction had collected in the moisture trap. The catalyst was removed by shaking the reaction mixture with 200 parts of a two per cent sodium carbonate solution and washing with water, and the xylene was removed by distillation in vacuo. The crude product, obtained in this manner, was a crystalline material, which when recrystallized from petroleum ether, amounted to 86 parts, corresponding to a 30 per cent yield, and melting at 136° C. (uncorrected).

Analysis calculated for $C_{17}H_{17}NO_4$: N, 4.68; found, N, 4.81.

EXAMPLE IV

A mixture of 98 parts of cyclohexanone, 135 parts of 2-nitro-2-methyl-1,3-propanediol, 175 parts of benzene and 0.5 part of para-toluenesulfonic acid was refluxed until 13 parts of water had accumulated in the moisture trap, as in Example I. The reaction mixture was then cooled and agitated with approximately 200 parts of a two per cent sodium carbonate solution and washed with water. The nonaqueous layer was further washed, treated for an hour with ten parts of decolorizing carbon at 100° C., dissolved in approximately 1100 parts of ether and filtered; the filtrate was heated until almost all of the ether had evaporated. The crude 5-nitro-5-methyl-2,2-pentamethylene-1,3-dioxane obtained in this manner was recrystallized from ether, giving a product amounting to 200 parts, corresponding to a yield of 93 per cent.

Analysis calculated for $C_{10}H_{17}NO_4$: N, 6.51; found: N, 6.55.

The cyclic ketals prepared as outlined above, are either colorless liquids or white crystalline solids, and are soluble in the common organic solvents such as ether, benzene, and methanol. The following table lists some of these compounds, and the materials from which they are formed, as well as certain of their physical properties:

*Starting materials*

| Ketone | Nitrohydroxy compound | Product | Per cent yield | Melting point, °C. (uncorrected) | Boiling point (uncorrected) |
|---|---|---|---|---|---|
| Acetone | Tris(hydroxymethyl)nitromethane. | 5-nitro-2,2-dimethyl-5-hydroxymethyl-1,3-dioxane. | 44 | 130 | |
| Methyl ethyl ketone | 2-nitro-2-ethyl-1,3-propanediol | 5-nitro-2,5-diethyl-2-methyl-1,3-dioxane | 60 | | 96° C. at 2.5 mm. |
| Methyl i-butyl ketone | ----do---- | 5-nitro-2-i-butyl-5-ethyl-2-methyl-1,3-dioxane. | 35 | | 110° C. at 2 mm. |
| Chloro-acetone | Tris(hydroxymethyl)nitromethane. | 5-nitro-2-chloromethyl-5-hydroxymethyl-2-methyl-1,3-dioxane. | 87 | 114.5 | |
| Methyl benzyl ketone | ----do---- | 5-nitro-2-benzyl-5-hydroxymethyl-2-methyl-1,3-dioxane. | 45 | 68 | |
| Aceto-phenone | ----do---- | 5-nitro-5-hydroxymethyl-2-methyl-2-phenyl-1,3-dioxane. | 54 | 137.5 | |
| Cyclo-hexanone | 2-nitro-2-methyl-1,3-propanediol | 5-nitro-5-methyl-2,2-pentamethylene-1,3-dioxane. | 93 | 102.5 | |
| 2-methyl-cyclo-hexanone | 2-nitro-2-ethyl-1,3-propanediol | 5-nitro-5-ethyl-2,2-(1-methylpentamethylene) 1,3-dioxane. | 90 | 73.5 | |
| Cyclopentanone | 2-nitro-2-methyl-1,3-propanediol | 5-nitro-5-methyl-2,2-tetramethylene-1,3-dioxane. | 86 | 80 | |

Since the number of preparations of each of these products was limited, it is to be understood that, while the above properties will be useful in identifying the compounds of my invention, I do not desire to be restricted to materials which have the exact properties listed.

The nitro dioxanes of my invention have been found to be useful as insect repellents. They are likewise useful as intermediates in the preparation of numerous organic compounds. Other uses of these products will readily occur to those skilled in the art.

My invention now having been described, what I claim is:

1. Cyclic ketals having the structural formula:

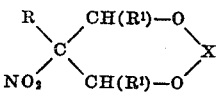

wherein R represents a member selected from the group consisting of hydrogen, alkyl, and alpha-hydroxyalkyl, $R^1$ represents a member of the group consisting of hydrogen, alkyl, aryl, and furyl, and X represents a member selected from the group consisting of cycloalkylidene, alkyl-substituted monocycloalkylidene, and

wherein $R^2$ and $R^3$ represent members selected from the group consisting of alkyl, aryl, aralkyl, alpha-haloalkyl, and furyl.

2. Cyclic ketals having the structural formula:

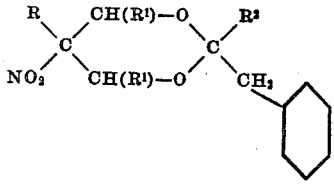

in which R is a member of the group consisting of hydrogen, alkyl, and alpha-hydroxyalkyl, $R^1$ is a member of the group consisting of hydrogen, alkyl, aryl, and furyl, and $R^2$ is a member of the group consisting of alkyl, alpha-haloalkyl, aryl, aralkyl, and furyl.

3. Cyclic ketals having the formula:

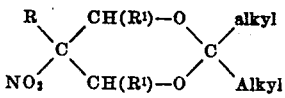

in which R is a member of the group consisting of hydrogen, alkyl, and alpha-hydroxyalkyl, and $R^1$ is a member of the group consisting of hydrogen, alkyl, aryl, and furyl.

4. Cyclic ketals having the structural formula:

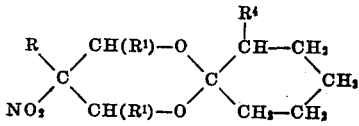

wherein R is a member of the group consisting of hydrogen, alkyl, and alpha-hydroxyalkyl, $R^1$ is a member of the group consisting of hydrogen, alkyl, aryl, and furyl, and $R^4$ represents a member selected from the group consisting of hydrogen and alkyl.

5. 5-nitro-5-methyl-2-hexyl-2-methyl-1,3-dioxane.

6. 5-nitro-5-methyl-2,2-pentamethylene-1,3-dioxane.

7. 5-nitro-5-hydroxymethyl-2-methyl-2-phenyl-1,3-dioxane.

8. In a process for the production of cyclic ketals, the step which comprises reacting a ketone with a polyhydroxy compound in the presence of a catalyst, wherein said polyhydroxy nitro compound is of the formula:

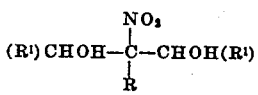

in which $R^1$ is a member of the group consisting of hydrogen, alkyl, aryl, and furyl, and R is a member of the group consisting of hydrogen, alkyl, and alpha-hydroxyalkyl, said ketone having the general formula:

RCOR[1]

in which R and $R^1$ individually represent members of the group consisting of alkyl, alpha-haloalkyl, aryl, aralkyl, and furyl, and combined represent monocycloalkylidene.

MURRAY SENKUS.